United States Patent [19]

Nutt

[11] 4,262,834
[45] Apr. 21, 1981

[54] LADDER RACK

[75] Inventor: Wallace H. Nutt, Woodstock, Canada

[73] Assignee: Teledyne Canada, Limited, Woodstock, Canada

[21] Appl. No.: 120,904

[22] Filed: Feb. 12, 1980

[51] Int. Cl.³ .............................................. B60R 9/04
[52] U.S. Cl. .................................. 224/324; 224/323; 211/13; 248/503; 182/127
[58] Field of Search ............... 224/324, 317, 319, 323, 224/331, 42.39, 321, 322, 325, 42.19, 42.11; 248/503; 280/769; 269/135; 414/462; 211/13; 182/127

[56]  References Cited
U.S. PATENT DOCUMENTS

| 2,237,853 | 4/1941 | Troche | 224/42.11 X |
|---|---|---|---|
| 2,615,667 | 10/1952 | Smith et al. | 224/324 |
| 3,251,519 | 5/1966 | Jones | 224/323 X |
| 3,443,730 | 5/1969 | Meusel | 224/42.38 X |
| 3,672,612 | 6/1972 | Laing, Jr. | 224/323 X |
| 3,722,766 | 3/1973 | Barrineau et al. | 224/331 X |
| 3,826,390 | 7/1974 | Watson | 224/324 X |
| 3,877,624 | 4/1975 | Carson | 248/503 X |
| 3,888,398 | 6/1975 | Payne | 248/503 X |
| 3,904,094 | 9/1975 | Correll | 248/503 X |
| 4,008,838 | 2/1977 | Correll | 211/13 X |
| 4,170,331 | 10/1979 | Faulstich | 224/324 |

Primary Examiner—Steven M. Pollard
Attorney, Agent, or Firm—Ridout & Maybee

[57] ABSTRACT

A vehicle roof rack comprises a rack frame and a releasable clamping device for releasably clamping a ladder thereto. The clamping device includes a clamp arm which is pivoted to a rigid support and operated by a crank mechanism by moving across a dead-center position to clamp the ladder in place. Clamping members are resiliently supported on the clamp arm to engage the ladder and exert a clamping pressure on it.

7 Claims, 5 Drawing Figures

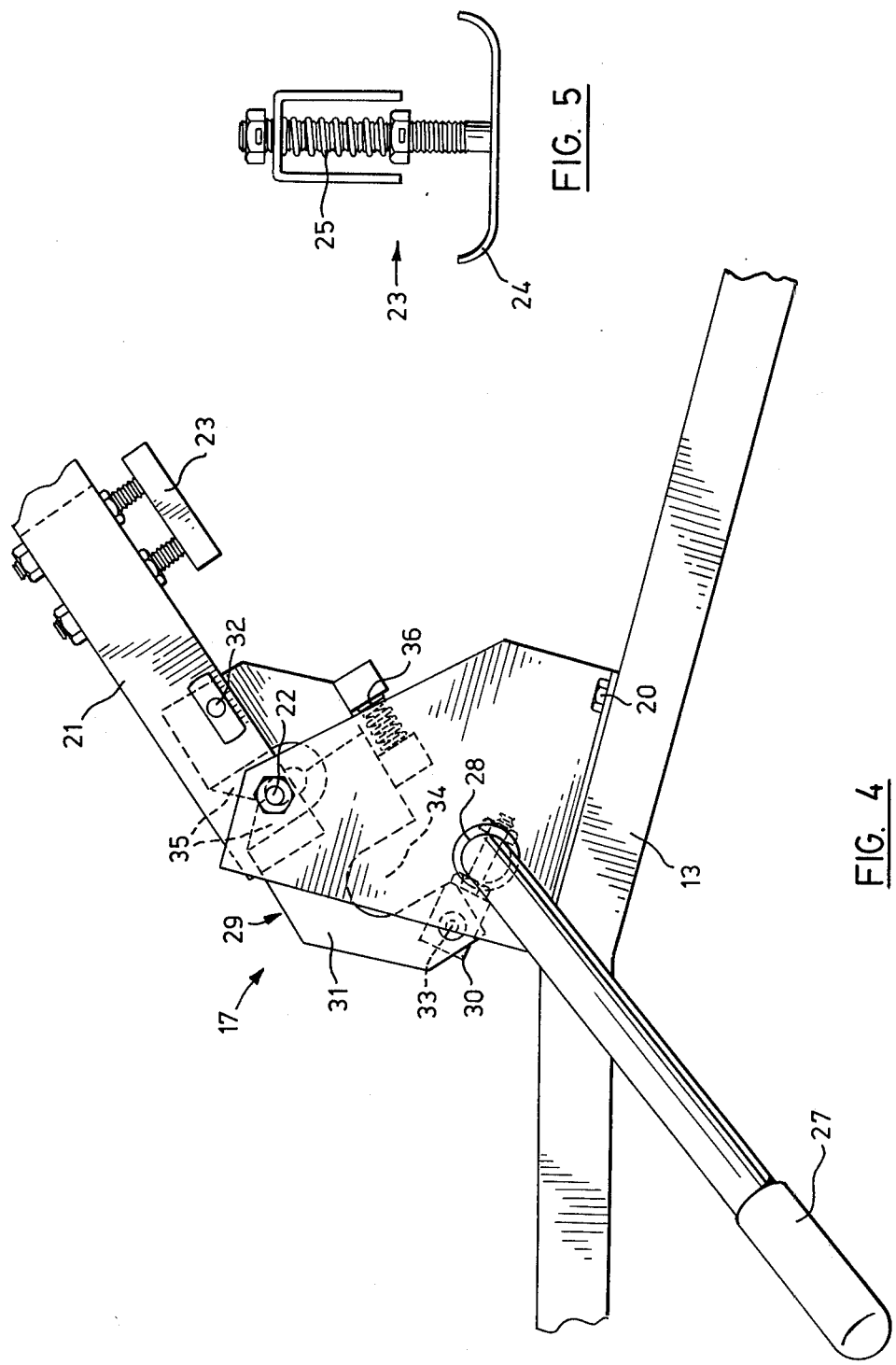

LADDER RACK

This invention relates to vehicle roof racks of the type comprising a load supporting frame and a releasable clamping device thereon for releasably clamping a load in position on the frame. The invention relates more particularly to a ladder rack for attachment to the roof of a vehicle, such as a truck, having a clamping mechanism for releasably clamping a ladder or like implement in supported relation to the rack so that it will not become dislodged when the vehicle is travelling. Ladder racks of this general type are disclosed, for example, in U.S. Pat. Nos. 2,237,853, 3,251,519, 3,826,390, 3,904,094 and 4,008,838.

It is an object of the present invention to provide a simple and reliable clamping mechanism in such a roof rack.

A vehicle roof rack in accordance with the invention comprises a load supporting frame and a releasable clamping device thereon for releasably clamping a load in position on the frame. The clamping device comprises a support bracket rigidly mounted on the frame, a clamp arm pivotally connected to the support bracket for pivotal movement about a fixed horizontal axis between a clamping position and a release position, load engaging means mounted on the clamp arm and resilient means cooperating therewith for biassing the load engaging means into clamping engagement with the load, a crankshaft journalled in said support bracket for rotation about an axis parallel to said horizontal axis, and a linkage interconnecting the crankshaft with the clamp arm, said linkage being movable through a dead-centre position in response to rotation of the crankshaft whereby to move the clamp arm between its clamping and release positions.

In order that the invention may be readily understood, one embodiment thereof will now be described, by way of example, with reference to the accompanying drawings in which:

FIG. 4 shows a detail of the clamp in its open position; and

FIG. 5 shows a resiliently biased clamping plate forming part of the assembly.

Figure 1:
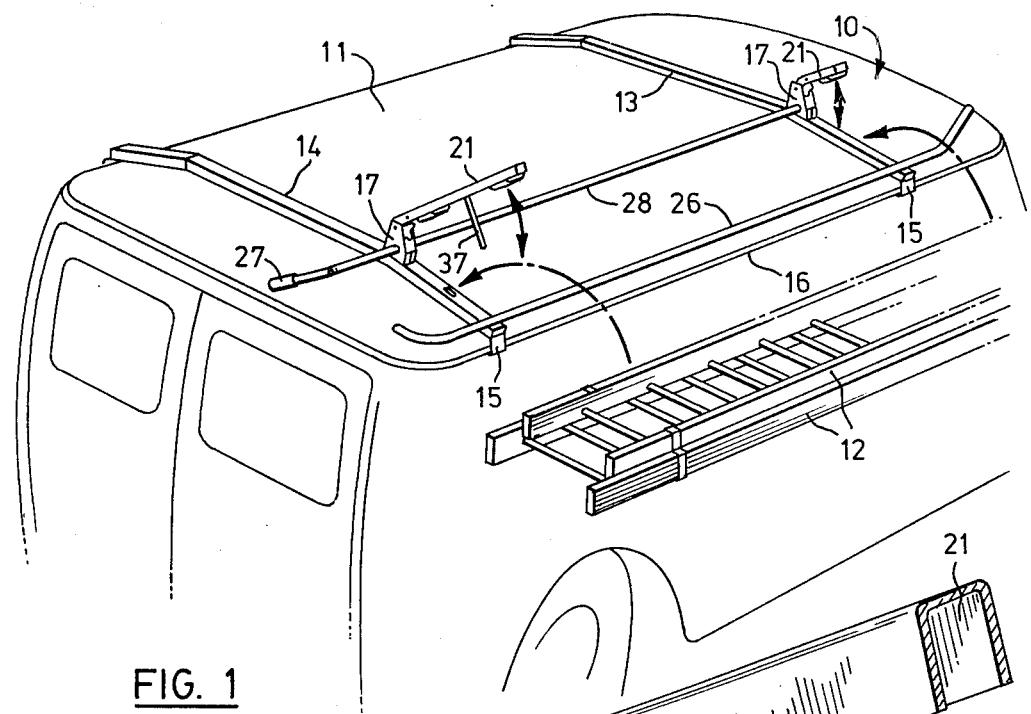
FIG. 1 is a perspective view showing the roof of a vehicle with the ladder rack mounted in place.
Figure 2:
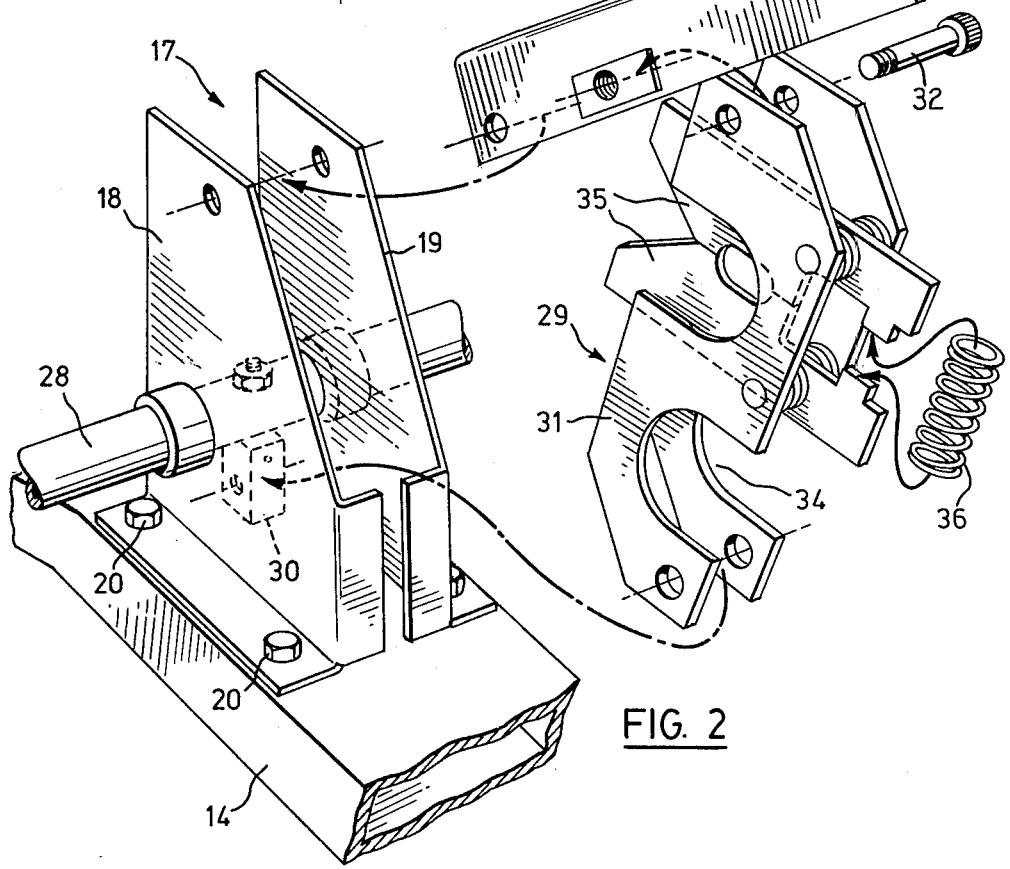
FIG. 2 is an exploded view showing component parts of the clamping mechanism.
Figure 3:
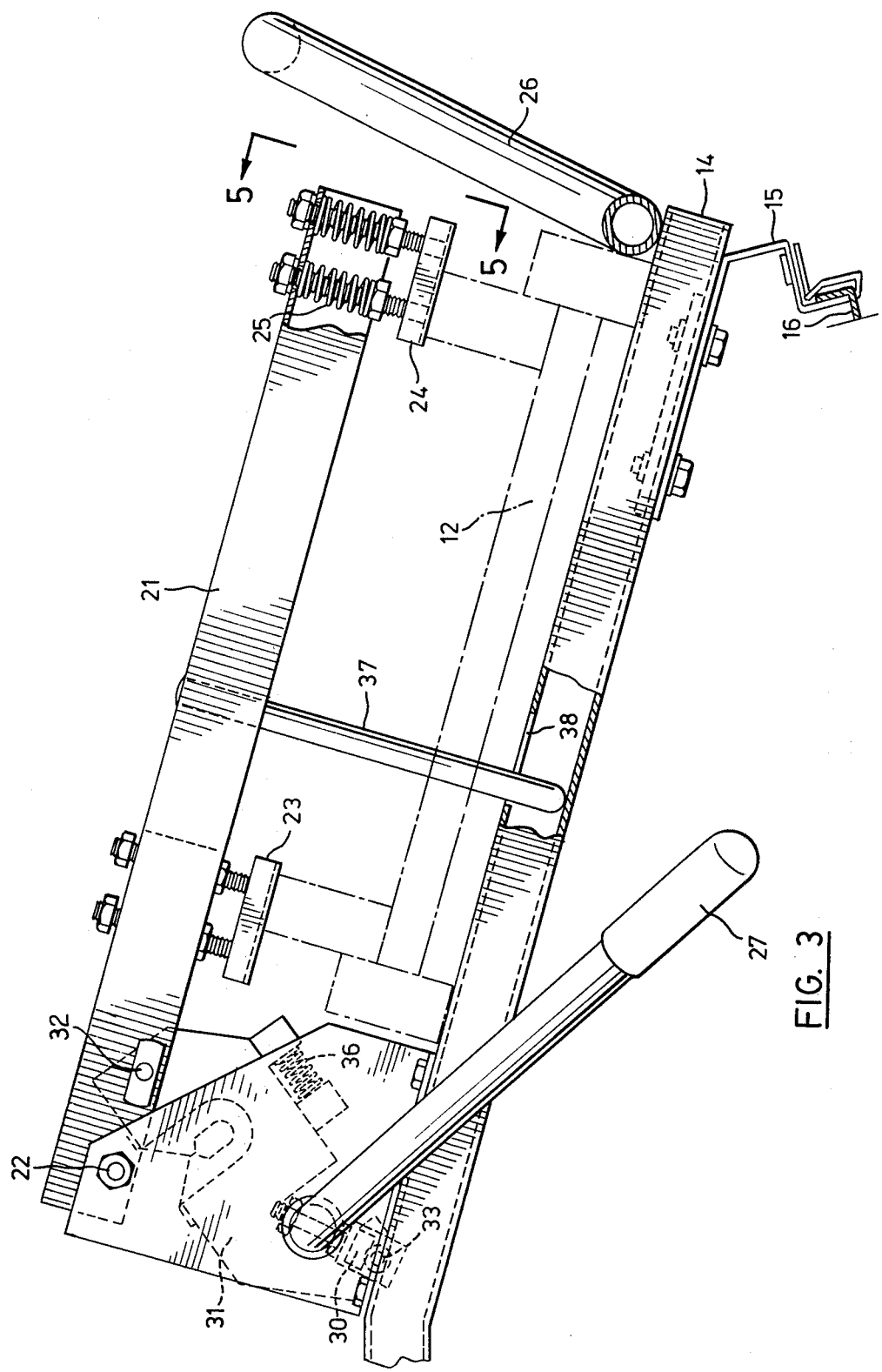
FIG. 3 is an end view, partly in section, of a detail of the ladder rack with the clamp in its clamping position.

Referring to the drawings, FIG. 1 shows part of a vehicle 10 having a roof 11 to which is attached a rack for carrying ladders 12 for similar implements. The rack comprises a load supporting frame including a pair of fore and aft transverse frame members 13, 14, these frame members extending across the roof 11 and being secured in place by sheet metal brackets 15 which engage the guttering 16 at the sides of the roof. Each of the transverse frame members 13, 14 is formed as a hollow beam of rectangular cross section. A pair of longitudinally aligned support brackets 17 are rigidly mounted on the transverse frame members, each support bracket comprising a pair of upstanding flanged plates 18, 19 which are bolted to the beams by bolts 20. A pair of clamp arms 21 are pivotally connected to the support brackets 17, by means of pivot pins 22, so that the arms can be pivotally moved about a common fixed horizontal, longitudinal axis between a clamping position, shown in FIG. 3, and a release position, shown in FIG. 4. The clamp arms are in the form of U-sectioned beams. Each clamp arm 21 carries load engaging means on its underside, the load engaging means being constituted by a pair of clamping plates 23, 24, which, when the clamp arm 21 is in the clamping position shown in FIG. 3, are resiliently biassed into clamping engagement with the ladders 12 by compression springs 25. It will be noted that the ladders are located in stacked relationship alongside one edge of the roof by a side rail 26.

To operate the clamp arms 21 between their clamping and release positions, an operating handle 27 is provided. The operating handle 27 has a longitudinally extending shaft 28 which is journalled in each of the support brackets 17 for rotation about an axis parallel to the pivotal axis of the clamp arms. A pair of crank linkages 29 interconnect the clamp arms 21 with the crankshaft 28. Thus, each of the linkages 29 comprises a crank arm 30 extending radially from the shaft 28, and a connecting link 31 which is pivotally connected at one end to the crank arm 30 by a pin 33 and is pivotally connected at its other end to the clamp arm 21 by a pin 32, the latter connection being at an intermediate position between the pivot pin 22 and the connection to the spring-loaded clamping plate 23 or 24. The arrangement is such that the link 31 moves through a dead-centre position in response to rotation of the shaft 28 between its limits, thereby moving the clamp arm 21 from the release position to the clamping position or vice versa.

Thus to bring the clamp arms 21 from the release position shown in FIG. 4 to the clamping position shown in FIG. 3, the handle 27 is turned to move the shaft 28 in the counter-clockwise direction. The resultant movement of the crank arms 30, which are connected to the links 31, pulls down the clamp arms so that the clamping plates 23, 24 engage ladders 12 to hold them against the crossmembers 13, 14. During this movement the crank arms 30 move past a dead-centre position thereby securing the clamp arms in the clamping position against the pressure of the springs 25. Similarly, to release the clamp arms, the handle 27 is rotated in the clockwise direction thereby bringing the crank arm 30 to the other side of its dead centre and so raising the clamp arms.

Each connecting link 31 is formed with a detent 34 which is positioned to receive the shaft 28 when the clamp arm 21 is brought to the clamping position shown in FIG. 3. The shaft 28 thus does not obstruct the movement of the linkages. As shown in FIG. 4, each of the connecting links 31 also carries a spring clamp comprising a pair of pivoted jaws 35 which are biassed closed by a compression spring 36, the spring clamps being engageable with the pivot pins 22 for retaining the clamp arms 21 in the raised or release position.

A safety stop pin 37 extending perpendicularly from the rear clamp arm 21 is positioned to extend through an aperture 38 in the top surface of the associated beam 13. The safety pin 37 provides an additional stop mechanism to prevent movement of the ladder rack to the fore or aft in the event of a vehicle collision.

What I claim is:

1. A vehicle roof rack comprising a load supporting frame and a releasable clamping device thereon for releasably clamping a load in position on the frame, said clamping device comprising:

a support bracket rigidly mounted on the frame, a clamp arm pivotally connected to the support bracket for pivotal movement about a fixed horizontal axis between a clamping position and a release position, load engaging means mounted on the clamp arm and resilient means cooperating therewith for biassing said load engaging means into clamping engagement with the load, a crankshaft journalled in said support bracket for rotation about an axis parallel to said horizontal axis, and a linkage interconnecting said crankshaft with said clamp arm, said linkage being connected to the clamp arm at an intermediate position between said fixed axis and said load engaging means, and said linkage being movable through a dead-centre postion in response to rotataion of the crankshaft whereby to move said clamp arm between its clamping and release positions.

2. A vehicle roof rack according to claim 1, wherein said linkage comprises a crank arm extending from the crankshaft and a connecting link pivotally connected to the crank arm and pivotally connected to the clamp arm at said intermediate position.

3. A ladder rack for attachment to the roof of a vehicle comprising:

a load supporting frame including a pair of fore and aft transverse frame members, a pair of longitudinally aligned support brackets rigidly mounted on said transverse frame members, a pair of clamp arms pivotally connected to said support brackets for pivotal movement about a common longitudinal axis between a clamping position and a release position, load engaging means mounted on each of said clamp arms and resilient means cooperating therewith for biassing the load engaging means into clamping engagement with a load carried by the frame, an operating handle having a longitudinal shaft journalled in said support brackets for rotation about a second longitudinal axis, a pair of crank linkages interconnecting said shaft with said clamp arms, each said linkage being pivotally connected to the respective clamp arm at an intermediate position between said common axis and the load engaging means mounted thereon, said linkages being movable through a dead-centre position in response to rotation of the shaft whereby to move the clamp arms between their clamping and release positions.

4. A ladder rack according to claim 3, wherein each of said linkages comprises a crank arm extending from said shaft and a connecting link pivotally connected to the crank arm and to the respective clamp arm.

5. A ladder rack according to claim 3, wherein said load engaging means comprise a pair of clamping plates mounted on each of said clamp arms, said resilient means comprising compression springs bearing on the clamping plates.

6. A ladder rack according to claim 3, wherein each said connecting link carries a spring clamp engageable with a cross pin on the associated clamp arm for retaining the clamp arm in the release position.

7. A ladder rack according to claim 3, wherein each clamp arm carries a stop pin positioned to engage in an aperture in the associated one of said frame members, when the clamp arm is in the clamping position, thereby providing an abutment for restraining sliding movement of load in the longitudinal direction.

* * * * *